United States Patent
Ueda

(10) Patent No.: US 9,471,306 B2
(45) Date of Patent: Oct. 18, 2016

(54) INFORMATION PROCESSING APPARATUS AND COPY CONTROL METHOD

(71) Applicant: FUJITSU LIMITED, Kawasaki-shi, Kanagawa (JP)

(72) Inventor: Akihiro Ueda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 101 days.

(21) Appl. No.: 13/938,265

(22) Filed: Jul. 10, 2013

(65) Prior Publication Data

US 2014/0068233 A1 Mar. 6, 2014

(30) Foreign Application Priority Data

Aug. 30, 2012 (JP) ................................. 2012-189725

(51) Int. Cl.
| | | |
|---|---|---|
| *G06F 3/00* | (2006.01) | |
| *G06F 9/30* | (2006.01) | |
| *G06F 13/16* | (2006.01) | |
| *G06F 13/38* | (2006.01) | |
| *G06F 3/06* | (2006.01) | |

(52) U.S. Cl.
CPC ........... *G06F 9/30007* (2013.01); *G06F 3/061* (2013.01); *G06F 3/065* (2013.01); *G06F 3/0689* (2013.01); *G06F 3/0613* (2013.01); *G06F 13/1689* (2013.01); *G06F 13/385* (2013.01); *G06F 2206/1012* (2013.01)

(58) Field of Classification Search
None
See application file for complete search history.

(56) References Cited

U.S. PATENT DOCUMENTS

| | | | |
|---|---|---|---|
| 6,467,034 B1 | 10/2002 | Yanaka | |
| 8,200,837 B1 * | 6/2012 | Bhatti | H04L 67/02 709/219 |
| 2006/0195666 A1 * | 8/2006 | Maruyama et al. | 711/162 |

(Continued)

FOREIGN PATENT DOCUMENTS

| | | |
|---|---|---|
| JP | 2000-276304 A | 10/2000 |
| JP | 2006-053737 | 2/2006 |
| JP | 2006-236019 | 9/2006 |
| JP | 2008-250695 | 10/2008 |
| JP | 2009-122873 | 6/2009 |

OTHER PUBLICATIONS

Chinese Office Action issued on Mar. 7, 2016 for corresponding Chinese Patent Application No. 201310329637.0, with English Translation, 17 pages.

(Continued)

*Primary Examiner* — Henry Tsai
*Assistant Examiner* — Aurangzeb Hassan
(74) *Attorney, Agent, or Firm* — Fujitsu Patent Center

(57) ABSTRACT

The information processing apparatus includes a creating unit and a control unit. On receiving an offloaded data transfer instruction, the creating unit creates a copy session for transferring data from a transfer-source memory area of a transfer-source memory apparatus to a transfer-destination memory area of a transfer-destination memory apparatus. When detecting no overload incurred by asynchronous execution control under which the data transfer is executed out of sync with the offloaded data transfer instruction, the control unit determines that the data transfer of the created copy session is to be executed under the asynchronous execution control. On the other hand, when detecting overload incurred by the asynchronous execution control, the control unit determines that the data transfer of the created copy session is to be executed under synchronous execution control in which the data transfer is executed in synchronization with the offloaded data transfer instruction.

6 Claims, 10 Drawing Sheets

(56) References Cited

U.S. PATENT DOCUMENTS

| | | | |
|---|---|---|---|
| 2008/0244035 A1* | 10/2008 | Horie | 709/217 |
| 2009/0125691 A1 | 5/2009 | Nakanishi | |
| 2011/0225294 A1* | 9/2011 | Chase | H04L 12/2602 |
| | | | 709/224 |
| 2013/0067122 A1* | 3/2013 | Pavlov | 710/22 |

OTHER PUBLICATIONS

Japanese Office Action mailed Jun. 28, 2016 for corresponding Japanese Patent Application No. 2012-189725, with Partial English Translation, 6 pages.

\* cited by examiner

INFORMATION PROCESSING APPARATUS AND COPY CONTROL METHOD

CROSS-REFERENCE TO RELATED APPLICATION

This application is based upon and claims the benefit of priority of the prior Japanese Patent Application No. 2012-189725, filed on Aug. 30, 2012, the entire contents of which are incorporated herein by reference.

FIELD

The embodiments discussed herein are related to an information processing apparatus and a copy control method.

BACKGROUND

For implementation of a file copy function or a file migration function offered by a host computer (server), conventionally, the host computer itself reads and writes data from and to a storage apparatus. This places a high load on a central processing unit (CPU) of the host computer and/or incurs a high communication load between the host computer and the storage apparatus.

In view of the above, some techniques have been proposed which reduce a load applied when the host computer reads and writes data from and to the storage apparatus.

Japanese Laid-open Patent Publication No. 2006-53737
Japanese Laid-open Patent Publication No. 2006-236019
Japanese Laid-open Patent Publication No. 2008-250695

On the other hand, there is a technique, called an offloaded data transfer (ODX) function, of reducing the CPU load of the host computer and the communication load between the host computer and the storage apparatus. The offloaded data transfer function enables loads associated with file copy and migration operations of the host computer to be transferred (offloaded) to the storage apparatus.

Therefore, supporting the offloaded data transfer function facilitates a reduction in the CPU load of the host computer and the communication load between the host computer and the storage apparatus. However, the storage apparatus may take on an excessive load from the host computer, and thus simply supporting the offloaded data transfer function does not always provide efficient copy control on the whole.

SUMMARY

According to one embodiment, there is provided an information processing apparatus including one or more processors each configured to perform a procedure including the following: creating, on receiving an offloaded data transfer instruction, a copy session for transferring data from a transfer-source memory area of a transfer-source memory apparatus to a transfer-destination memory area of a transfer-destination memory apparatus; and controlling switching between asynchronous execution control and synchronous execution control based on load incurred by the asynchronous execution control. The asynchronous execution control is data transfer control under which a completion response to the offloaded data transfer instruction is made prior to completion of the data transfer of the copy session and the data transfer is subsequently carried out. The synchronous execution control is data transfer control under which the completion response to the offloaded data transfer instruction is made after the completion of the data transfer of the copy session.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Several embodiments will be described below with reference to the accompanying drawings.

(a) First Embodiment

Figure 1:
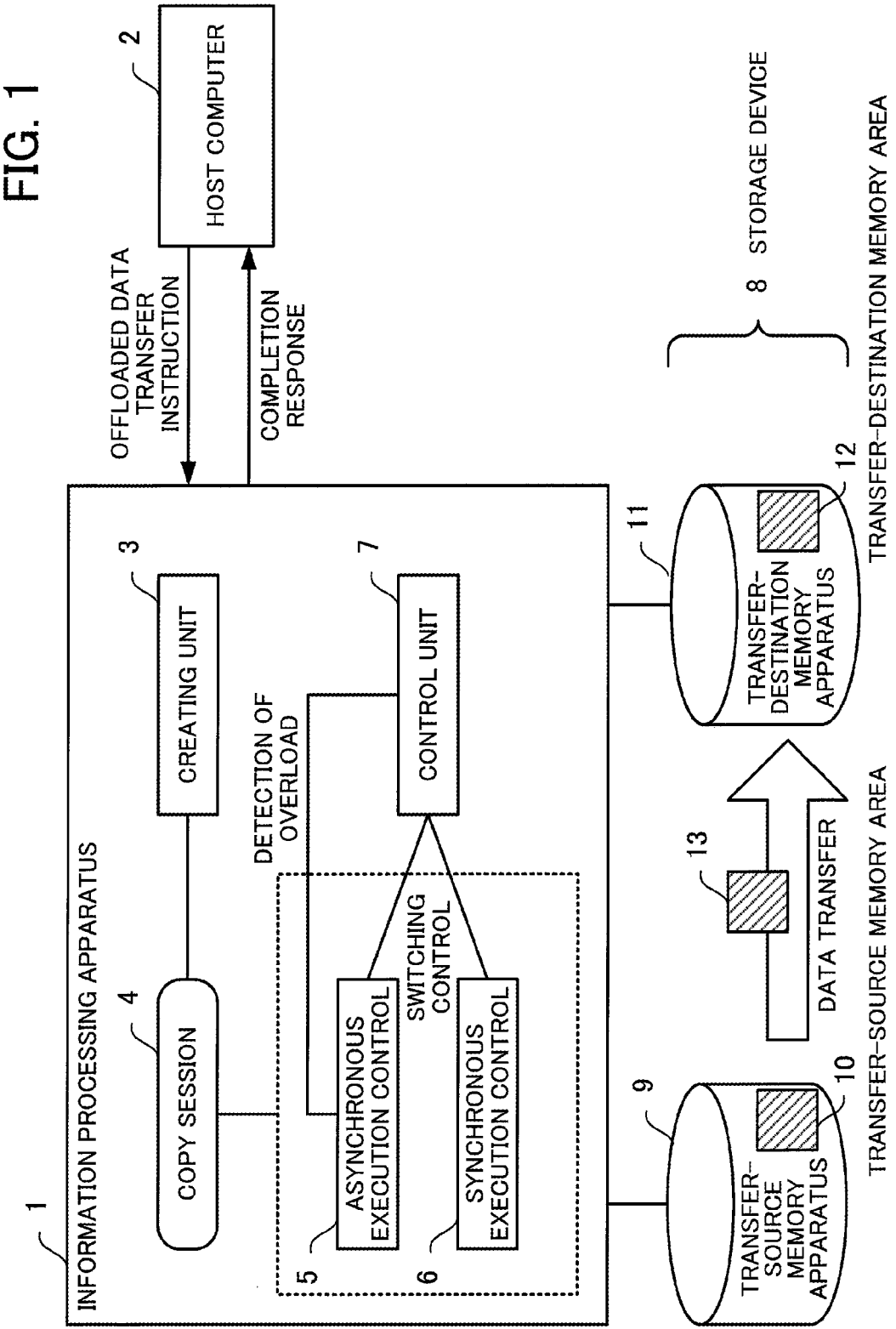
FIG. 1 illustrates a configuration example of an information processing apparatus according to a first embodiment.

First, an information processing apparatus according to a first embodiment is described with reference to FIG. 1. FIG. 1 illustrates a configuration example of an information processing apparatus according to the first embodiment. An information processing apparatus 1 is provided for copy control of a storage device (memory device) 8, and makes up a storage apparatus together with the storage device 8. The storage device 8 is able to record needed information, and a hard disk drive (HDD) and a solid state drive (SSD) are examples of the storage device 8.

The information processing apparatus 1 is connected to a host computer 2 so as to communicate with each other. The host computer 2 provides a file server function to, for example, an operation terminal (not illustrated). The information processing apparatus 1 receives an instruction of offloaded data transfer (referred to as the "offloaded data transfer instruction") from the host computer 2. Offloaded data transfer is a tokenized operation to transfer data within the same storage apparatus or between two different storage apparatuses. The use of a token representing control information of the data transfer eliminates buffered data movement, that is, eliminates the need of the host computer 2 to read and write data to be transferred. Note that the data transfer cited here includes data copy and data migration, and data may be transferred in discretionary units, for example, on a file-by-file basis or a volume-by-volume basis.

The information processing apparatus 1 includes a creating unit 3 and a control unit 7. Upon receiving an offloaded data transfer instruction, the creating unit 3 creates a copy session 4 for transferring data 13 from a transfer-source memory area 10 of a transfer-source memory apparatus 9 to a transfer-destination memory area 12 of a transfer-destination memory apparatus 11.

The information processing apparatus 1 is capable of asynchronous execution control 5 under which a completion response to the offloaded data transfer instruction is made prior to completion of the data transfer of the copy session 4 and, subsequently, the data transfer is carried out. That is, using the asynchronous execution control 5, the information processing apparatus 1 carries out logical data transfer and sends a completion response to the offloaded data transfer instruction to the host computer 2, and then carries out physical data transfer after sending the completion response.

The information processing apparatus 1 is capable of synchronous execution control 6 under which a completion response to the offloaded data transfer instruction is made after the completion of the data transfer of the copy session 4. That is, using the synchronous execution control 6, the information processing apparatus 1 carries out physical data transfer and, then, sends a completion response to the offloaded data transfer instruction to the host computer 2 after completion of the physical data transfer.

As a result, the asynchronous execution control 5 allows the host computer 2 to complete data transfer rapidly. On the other hand, because carrying out the physical data transfer out of sync with the offloaded data transfer instruction and the completion response, the information processing apparatus 1 may be burdened with a large backlog of asynchronous data transfers corresponding to offloaded data transfer instructions from the host computer 2. That is, in the case of carrying out asynchronous data transfer, the information processing apparatus 1 may have significant accumulation of copy sessions 4 in a queue. Since the information processing apparatus 1 consumes resources (for example, memory resources) according to establishment of the copy sessions 4, an increase in the backlog of asynchronous data transfer leads to an increase in the load incurred by the asynchronous data transfer.

On the other hand, under the synchronous execution control 6, the information processing apparatus 1 does not send a completion response to the offloaded data transfer instruction to the host computer 2 until the completion of the physical data transfer. This limits input of offloaded data transfer instructions from the host computer 2.

The control unit 7 detects overload brought about by the asynchronous execution control 5. The detection of overload may be achieved by comparing a predetermined threshold and the status of load incurred by the asynchronous execution control 5. For example, the control unit 7 may detect overload by comparing the number of copy sessions 4 of data transfer under the asynchronous execution control 5 against the predetermined threshold.

Based on the detected load, the control unit 7 switches the data transfer of a copy session 4 created by the creating unit 3 between the asynchronous execution control 5 and the synchronous execution control 6. Specifically, when detecting no overload incurred by the asynchronous execution control 5, the control unit 7 causes the data transfer of the created copy session 4 to be carried out under the asynchronous execution control 5. On the other hand, if detecting overload incurred by the asynchronous execution control 5, the control unit 7 causes the data transfer of the created copy session 4 to be carried out under the synchronous execution control 6.

With this, the information processing apparatus 1 is able to carry out data transfer as making an effective use of resources thereof using the asynchronous execution control 5. In addition, the information processing apparatus 1 is able to carry out data transfer as preventing exhaustion of the resources thereof using the synchronous execution control 6. In this manner, it is possible to improve the efficiency of copy control (data transfer) in appropriate cooperation with the offloaded data transfer function supported by the host computer 2.

(b) Second Embodiment

Figure 2:
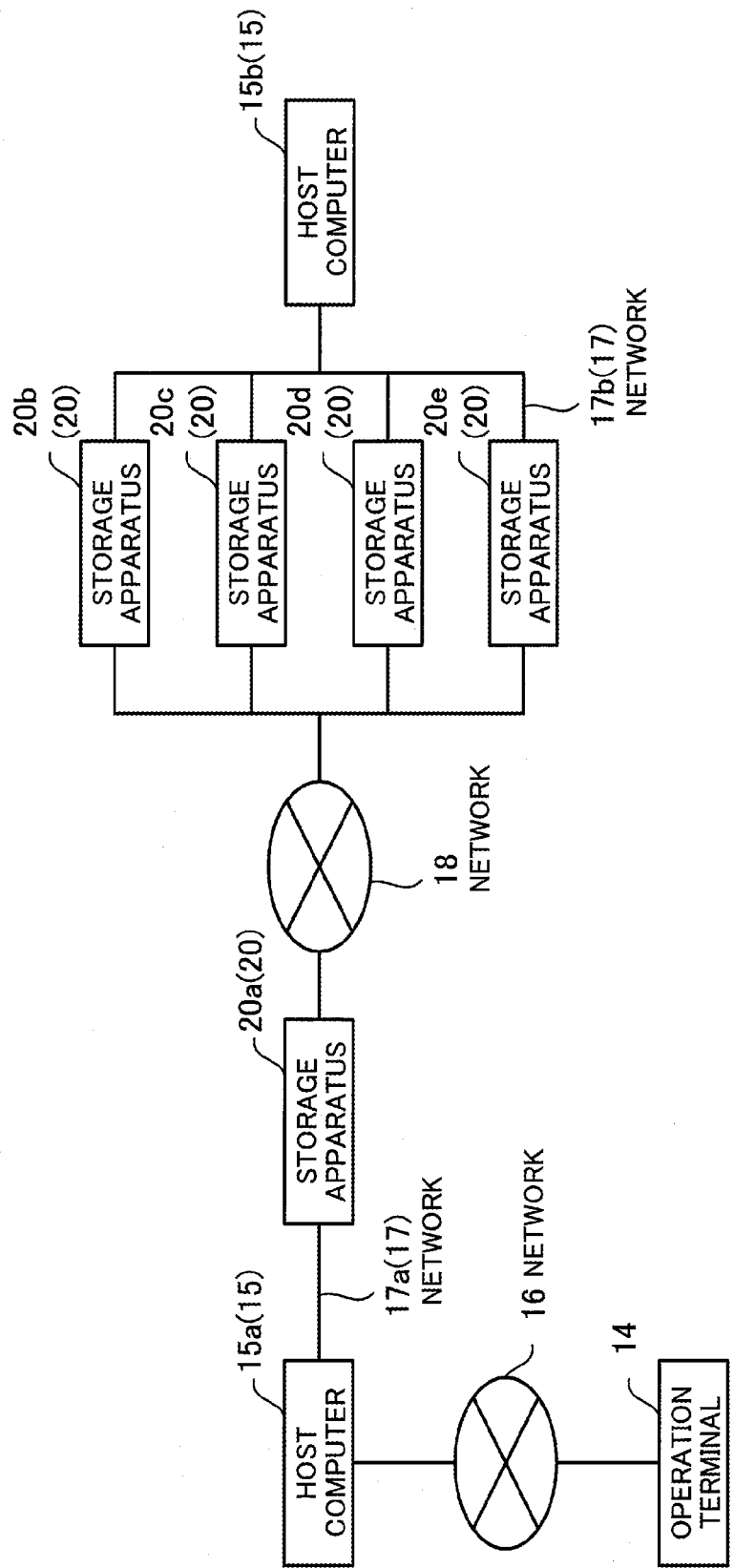
FIG. 2 illustrates an example of connecting storage apparatuses according to a second embodiment.

Next described is an example of connection of storage apparatuses according to a second embodiment, with reference to FIG. 2. FIG. 2 illustrates an example of connecting storage apparatuses according to the second embodiment.

A storage apparatus 20 is connected to a host computer 15 via a network 17 so as to communicate with each other. The network 17 is a storage area network (SAN) in which one or more storage apparatuses 20 and one or more host computers 15 are connected to each other.

A storage apparatus 20a is connected to a host computer 15a via a network 17a to communicate with each other, while storage apparatuses 20b, 20c, 20d, and 20e are connected to a host computer 15b via a network 17b to communicate with each other. In addition, the storage apparatuses 20a, 20b, 20c, 20d, and 20e are connected via a network 18 to communicate with each other. The network 18 is, for example, a network dedicated to storage apparatuses.

The host computer 15a is connected to an operation terminal 14 via a network 16 to communicate with each other. The network 16 is a local area network (LAN) or a wide area network (WAN) in which one or more host computers 15 and one or more operation terminals 14 are connected to each other.

Each of the storage apparatuses 20 has a capability to carry out a local copy operation in a storage device controlled by the storage apparatus 20, and also has a capability to carry out a remote copy operation with another storage apparatus 20. Each of the host computers 15 is configured to instruct a storage apparatus 20 to carry out a local or remote copy operation. When providing such an instruction regarding either a local or remote copy operation, the host computer 15 may also instruct the storage apparatus 20 to implement offloaded data transfer.

Figure 3:
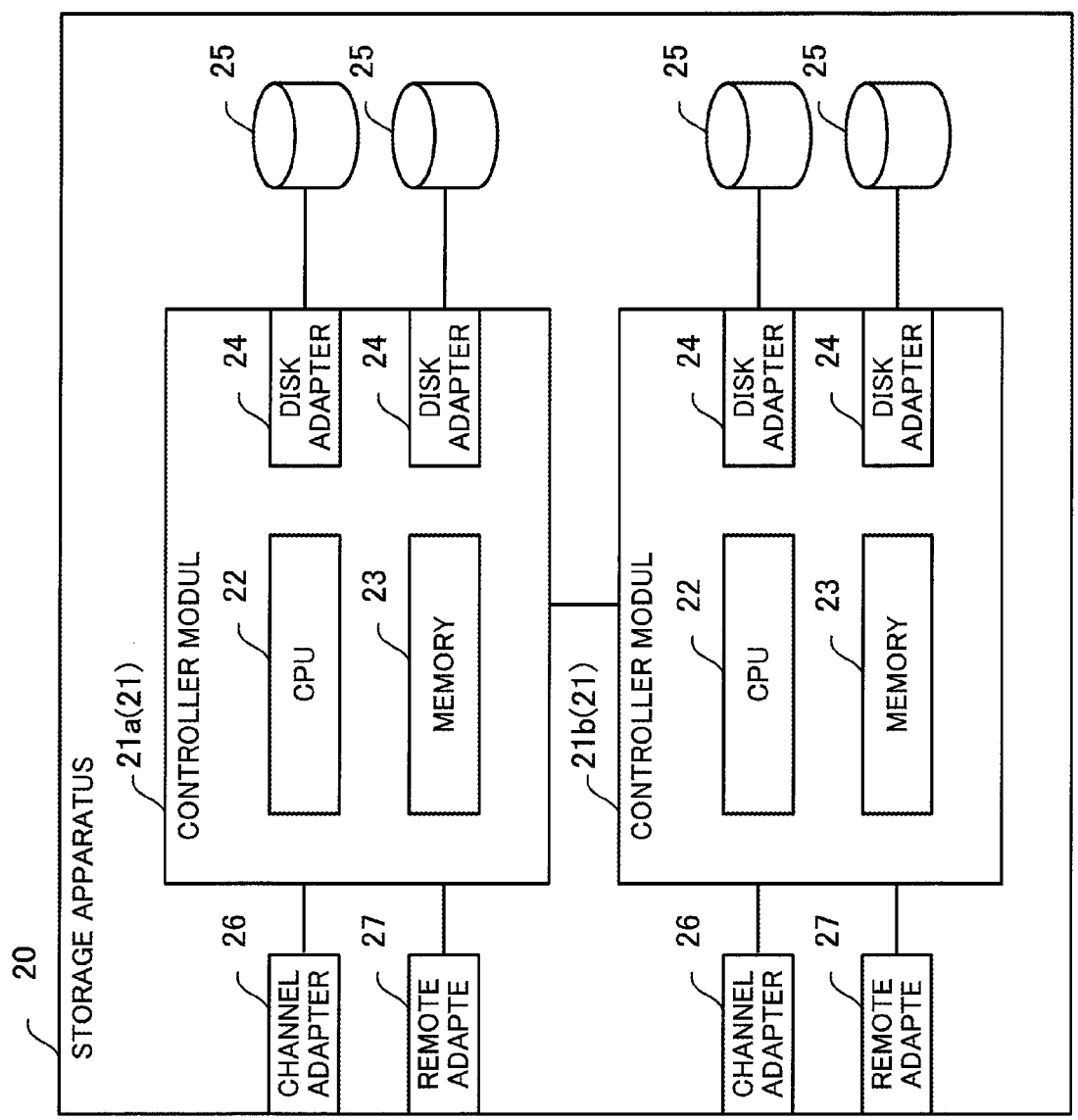
FIG. 3 illustrates a configuration example of a storage apparatus according to the second embodiment.

Next described is a storage apparatus according to the second embodiment, with reference to FIG. 3. FIG. 3 illustrates a configuration example of a storage apparatus according to the second embodiment. Each of the storage apparatuses 20 includes channel adapters 26, remote adapters 27, controller modules 21, and HDDs 25. The multiple HDDs 25 are combined to form a redundant array of inexpensive disks (RAID). The HDDs 25 store therein user data and control information (such as one or more session management tables to be described later).

The individual controller modules 21 are information processing apparatuses for controlling access to the HDDs 25. The access control for a HDD 25 provided by each of the controller modules 21 includes controlling of data transfer in which the HDD 25 is a data transfer source or destination.

The storage apparatus 20 includes two controller modules 21, denoted as 21a and 21b. Each of the controller modules 21a and 21b connects through disk adapters 24 to its control-target HDDs 25. The controller modules 21a and 21b are connected to each other. Although the storage apparatus 20 according to this embodiment includes two controller modules 21, the configuration is not limited to this and, hence, the storage apparatus 20 may include either one of the controller modules 21a and 21b. Alternatively, the storage apparatus 20 may include three or more controller modules 21, for example, four or eight controller modules 21.

The storage apparatus 20 connects through the channel adapters 26 to the host computer 15. A channel adapter 26 is provided for each controller module 21. In addition, the controller module 21 may be associated with multiple (for example, two) channel adapters 26, which allows the controller module 21 to connect with the host computer 15 using multiple paths. The storage apparatus 20 connects through the remote adapters 27 to other storage apparatuses 20. A remote adapter 27 is provided for each controller module 21.

The controller module 21 includes a CPU 22, a memory 23, and the disk adapters 24. The CPU 22 controls data transfer from a memory area of a transfer-source memory apparatus to a memory area of a transfer-destination memory apparatus. The memory 23 holds data when the data is read from an associated HDD 25, and also functions as a buffer when data is to be written to an associated HDD 25. In addition, the memory 23 stores therein user data and control information. Each of the disk adapters 24 controls interface with (i.e. access to) its corresponding HDD 25.

The storage apparatus 20 having the above-described configuration is capable of controlling data transfers associated with the HDDs 25 controlled by the controller modules 21.

Note that the whole of each controller module 21 is controlled by its CPU 22. To the CPU 22, the corresponding memory 23 is connected via a bus (not illustrated). In addition, peripherals (not illustrated) are connected or connectable to the CPU 22 via a bus (not illustrated). The CPU 22 is an example of a processor, and may be, for example, a micro processing unit (MPU), a digital signal processor (DSP), an application specific integrated circuit (ASIC), or a programmable logic device (PLD). In addition, the CPU 22 may be a single or multiple processor. Further, the CPU 22 may be formed as a combination of two or more of CPU, MPU, DSP, ASIC, and PLD.

The memory 23 is made up of a random access memory (RAM) and a non-volatile memory. The RAM is used as a primary memory apparatus of the controller module 21. The RAM temporarily stores therein at least part of an operating system (OS) program, OS firmware, and application programs to be executed by the CPU 22. The RAM also stores various types of data needed by the CPU 22 for its processing. The non-volatile memory holds memory contents when the power is disconnected from the storage apparatus 20. The non-volatile memory is, for example, a semiconductor memory device, such as an electrically erasable programmable read-only memory (EEPROM) and a flash memory, or a HDD. In addition, the non-volatile memory is used as a secondary memory apparatus of the controller module 21. The non-volatile memory stores therein the OS program and firmware, the application programs, and the various types of data.

The peripherals to be connected via the bus to the CPU 22 include an input/output interface and a communication interface. The input/output interface connects with an input/output apparatus, such as a HDD, to carry out input/output operations. The input/output interface transmits signals and data sent from a memory apparatus, such as a HDD, to the CPU 22 or a cache memory (the memory 23). The communication interface transmits and receives data to and from a different controller module 21 provided in the same storage apparatus 20.

The hardware configuration described above achieves the processing functions of the controller module 21 according to this embodiment. Note that the host computer 15 as well as the information processing apparatus 1 of the first embodiment may be constructed with the same hardware configuration.

Figure 4:
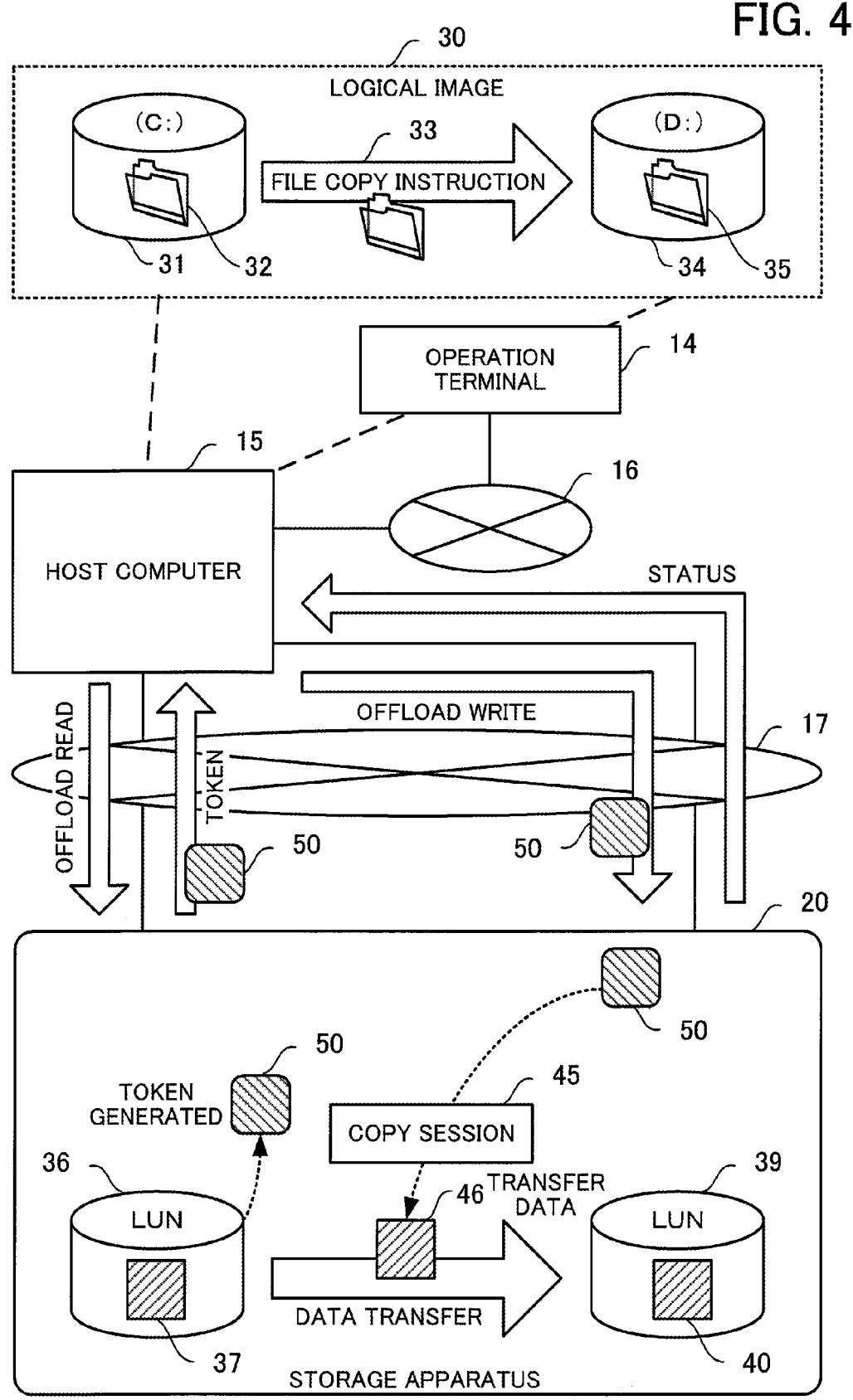
FIG. 4 illustrates an example of a synchronous copy operation of offloaded data transfer according to the second embodiment.

Next described is a synchronous operation of offloaded data transfer implemented by the CPU 22 according to the second embodiment, with reference to FIG. 4. FIG. 4 illustrates an example of a synchronous copy operation of offloaded data transfer according to the second embodiment.

The host computer 15 implements offloaded data transfer in response to an operation made by the operation terminal 14 to instruct a file copy operation. For example, the host computer 15 provides, to the operation terminal 14, a logical image 30 including volumes 31 and 34, as illustrated in FIG. 4. Assuming here that the operation terminal 14 recognizes the volumes 31 and 34 as C drive and D drive, respectively, the operation terminal 14 issues, for example, a file copy instruction 33 which instructs copying of a file 32 on the C drive to create a copied file 35 on the D drive. Upon receiving the file copy instruction 33, the host computer 15 sends an OFFLOAD READ request to a storage apparatus 20 corresponding to the volume 31. The OFFLOAD READ request includes information allowing transfer source data to be identified (also referred to as "transfer source data-identifiable information").

In response to the OFFLOAD READ request, the storage apparatus 20 generates a token 50 including the transfer source data-identifiable information. The transfer source data-identifiable information includes information about, for example, a transfer-source logical unit number (LUN) 36, a transfer-source memory area 37, and a transfer data size. The storage apparatus 20 sends the generated token 50 to the host computer 15.

The host computer 15 sends an OFFLOAD WRITE request to a storage apparatus 20 corresponding to the volume 34. The OFFLOAD WRITE request includes information allowing a transfer-destination memory area to be identified (also referred to as "transfer destination memory area-identifiable information") and the token 50 received from the storage apparatus 20.

In response to the OFFLOAD WRITE request, the storage apparatus 20 acquires information about data to be transferred (sometimes referred to as "transfer-target data") and the transfer destination memory area-identifiable information. With this, the storage apparatus 20 is able to identify the transfer-source LUN 36, the transfer-source memory area 37, the transfer data size, a transfer-destination LUN 39, and a transfer-destination memory area 40. The storage apparatus 20 creates a copy session 45 based on the identified information. According to the copy session 45, the storage apparatus 20 transfers transfer data 46 from the transfer-source memory area 37 of the transfer-source LUN 36 to the transfer-destination memory area 40 of the transfer-destination LUN 39. When transfer of the transfer data 46 is completed, the storage apparatus 20 notifies the host computer 15 of a STATUS. The STATUS denotes a completion response of the offloaded data transfer.

In the above-described manner, the host computer 15 acquires, in response to the OFFLOAD READ request, the token 50 as information allowing transfer-target data of the storage apparatus 20 to be identified. In addition, when sending the OFFLOAD WRITE request, the host computer 15 issues, to the storage apparatus 20, the token 50 as the information allowing transfer-target data of the storage apparatus 20 to be identified.

Use of the token 50 in this manner eliminates the need of the host computer 15 to read and write the transfer data 46. This also reduces the CPU load of the host computer 15 and the load incurred on the network 17 connecting the host computer 15 and the storage apparatus 20.

Such data transfer, that is, data transfer in the storage apparatus 20 being synchronized with the STATUS notification to the host computer 15, is referred to as the "synchronous operation of the offloaded data transfer".

Note that even in the case where multiple host computers 15 are connected to the network 16 and data transfer takes place between volumes recognized by the individual host computers 15, not the transfer data 46 but the token 50 is transmitted on the network 16. Because the storage apparatus 20 does not provide the transfer data 46 to the network 16, it is possible to prevent inadvertent information leaks.

Figure 5:
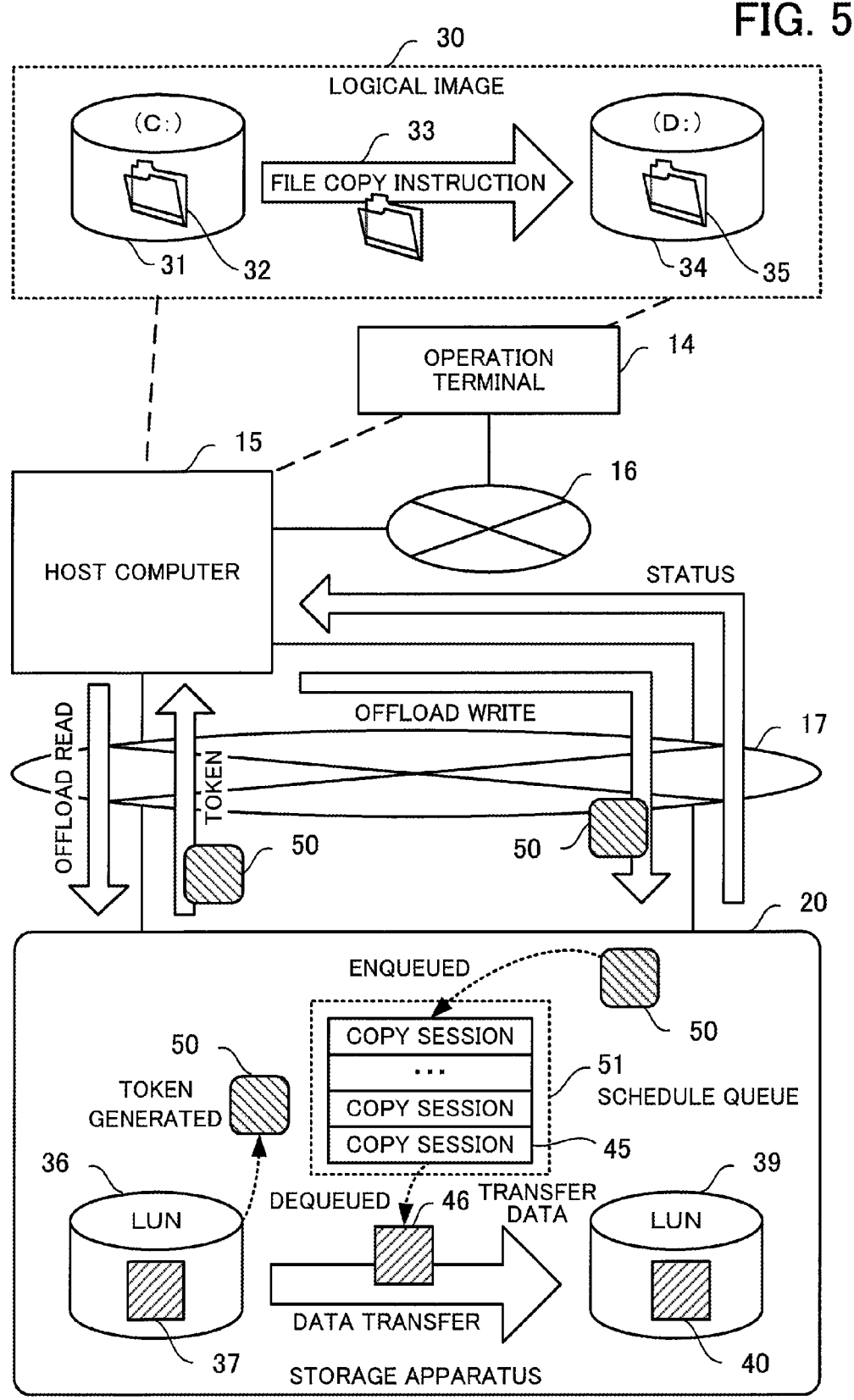
FIG. 5 illustrates an example of an asynchronous copy operation of the offloaded data transfer according to the second embodiment.

Next described is an asynchronous operation of offloaded data transfer implemented by the CPU 22 according to the second embodiment, with reference to FIG. 5. FIG. 5 illustrates an example of an asynchronous copy operation of offloaded data transfer according to the second embodiment.

The host computer 15 implements offloaded data transfer in response to an operation made by the operation terminal 14 to instruct a file copy operation. For example, the host computer 15 provides, to the operation terminal 14, the logical image 30 including the volumes 31 and 34, as illustrated in FIG. 5. Assuming here that the operation terminal 14 recognizes the volumes 31 and 34 as the C drive and D drive, respectively, the operation terminal 14 issues, for example, the file copy instruction 33 which instructs copying of the file 32 on the C drive to create the copied file 35 on the D drive. Upon receiving the file copy instruction 33, the host computer 15 sends an OFFLOAD READ request to a storage apparatus 20 corresponding to the volume 31. The OFFLOAD READ request includes transfer source data-identifiable information.

In response to the OFFLOAD READ request, the storage apparatus 20 generates a token 50 including the transfer source data-identifiable information. The storage apparatus 20 sends the generated token 50 to the host computer 15.

The host computer 15 sends an OFFLOAD WRITE request to a storage apparatus 20 corresponding to the volume 34. The OFFLOAD WRITE request includes information allowing a transfer-destination memory area to be identified (also referred to as "transfer destination memory area-identifiable information") and the token 50 received from the storage apparatus 20.

In response to the OFFLOAD WRITE request, the storage apparatus 20 acquires information about transfer-target data and the transfer destination memory area-identifiable information. With this, the storage apparatus 20 is able to identify the transfer-source LUN 36, the transfer-source memory area 37, the transfer data size, the transfer-destination LUN 39, and the transfer-destination memory area 40. The storage apparatus 20 creates a copy session 45 based on the identified information.

Although taking the same procedure as that of the synchronous operation of the offloaded data transfer up to this point, the asynchronous operation of the offloaded data transfer differs in the following respects.

The storage apparatus 20 notifies the host computer 15 of a STATUS without waiting for the transfer of the transfer data 46 to be completed. With this, the host computer 15 is able to receive the STATUS without waiting for time to transfer the transfer data 46 to the transfer-destination memory area 40 of the transfer-destination LUN 39.

Note that the storage apparatus 20 creates the copy session 45 before the notification of the STATUS, however, the copy session 45 may be created following the notification of the STATUS. Alternatively, the storage apparatus 20 may create the copy session 45 at a timing independent from the notification of the STATUS.

In the above-described manner, with the use of the token 50, the host computer 15 implements the asynchronous operation of the offloaded data transfer where reading and writing of the transfer data 46 is not needed, as in the case of the synchronous operation of the offloaded data transfer. This asynchronous operation of the offloaded data transfer also reduces the CPU load of the host computer 15 and the load incurred on the network 17 connecting the host computer 15 and the storage apparatus 20, like the case of the synchronous operation of the offloaded data transfer.

On the other hand, the storage apparatus 20 transfers the transfer data 46 out of sync with the notification of the STATUS. Because of this, the storage apparatus 20 may receive the next OFFLOAD WRITE request before completing the transfer of the transfer data 46, which may result in significant accumulation of copy sessions 45 in a queue.

Such data transfer, that is, data transfer in the storage apparatus 20 being out of sync with the STATUS notification (i.e., a completion response) to the host computer 15, is referred to as the "asynchronous operation of the offloaded data transfer".

The storage apparatus 20 enqueues a copy session 45 into a schedule queue 51 to accumulate multiple copy sessions 45 in the schedule queue 51. The storage apparatus 20 dequeues a copy session 45 from the schedule queue 51 at a scheduled timing. According to the dequeued copy session 45, the storage apparatus 20 transfers the transfer data 46 from the transfer-source memory area 37 of the transfer-source LUN 36 to the transfer-destination memory area 40 of the transfer-destination LUN 39.

After completing data transfer of one copy session 45 or implementing transfer of a predetermined size of data, the storage apparatus 20 carries out data transfer of the next copy session 45. Thus, until completing data transfer of the individual copy sessions 45, the storage apparatus 20 cyclically repeats data transfer operations as accumulating copy sessions 45 in the schedule queue 51.

Each time creating a copy session 45, the storage apparatus 20 also creates management information for managing the copy session 45. The management information may include, for example, a session management table and a bitmap. The session management table is a table created for each copy session 45 to manage the copy session 45. The bitmap is control information for ensuring data transfer to a checkpoint.

An increase in the number of copy sessions 45 accumulated in the schedule queue 51 results in increased consumption of memory resources of the storage apparatus 20 to save the management information corresponding to the accumulated copy sessions 45. Therefore, in the case of carrying out an asynchronous operation of the offloaded data transfer, the storage apparatus 20 manages the consumed amount of memory resources for storing the management information in order to prevent malfunction due to the exhaustion of memory resources. A failure of the offloaded data transfer function resulting from not being able to create a new copy session 45 is an example of such malfunction due to the exhaustion of memory resources.

Note that any memory available for the storage apparatus 20 may be used as the memory sources for storing the management information, and it may be the memory 23 or the HDDs 25. Alternatively, the memory resources for storing the management information may be limited to a preliminarily reserved area in the memory available for the storage apparatus 20. The management target of the storage apparatus 20 is not limited to memory resources, and the storage apparatus 20 may use other hardware resources, such as CPU resources, as its management target as long as the consumption of the resources increases as the number of copy sessions 45 accumulated in the schedule queue 51 increases. In addition, the storage apparatus 20 may use one or more types of resources as management targets.

Figure 6:
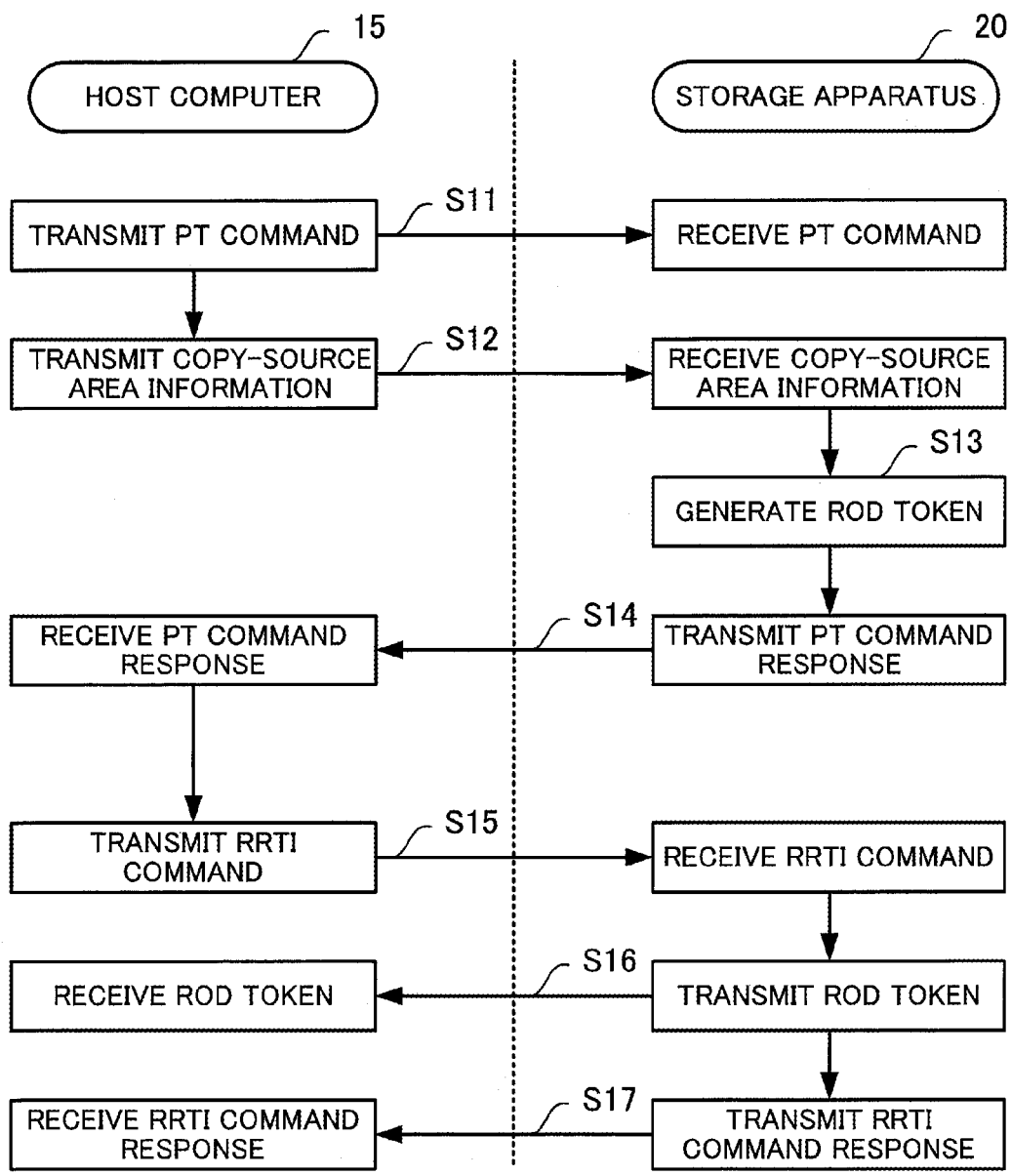
FIG. 6 illustrates a sequence diagram of an offload read process taking place during the offloaded data transfer according to the second embodiment.

A detailed command sequence related to the issuance of the OFFLOAD READ request from the host computer 15 to the storage apparatus 20 and the notification of the token 50 from the storage apparatus 20 to the host computer 15 described in FIGS. 4 and 5 is described next with reference to FIG. 6. FIG. 6 illustrates a sequence diagram of an offload read process taking place during offloaded data transfer according to the second embodiment.

An offload read process starts by the host computer 15 in response to a reception of an operation made by the operation terminal 14 to instruct a file copy operation. An OFFLOAD READ request is implemented using an EXTENDED COPY command and a RECEIVE COPY RESULTS command defined in the Small Computer System Interface (SCSI) standard. The EXTENDED COPY command and the RECEIVE COPY RESULTS command of this case are referred to as a Populate Token (PT) command and a Receive Rod Token Information (RRTI) command, respectively.

[Step S11] The host computer 15 transmits a Populate Token command to a storage apparatus 20 associated with the copy-source (i.e., transfer-source) volume 31 (hereinafter, also referred to as the "copy-source associated storage apparatus 20"). The copy-source associated storage apparatus 20 receives the Populate Token command from the host computer 15.

[Step S12] The host computer 15 transmits copy-source area information to the copy-source associated storage apparatus 20, which subsequently receives the copy-source area information therefrom. The copy-source area information (i.e., transfer source data-identifiable information) is information in a list form which contains information composed of the transfer-source LUN 36 and the transfer-source memory area 37.

[Step S13] The copy-source associated storage apparatus 20 generates a Representation of Data (ROD) token (i.e., token 50). The storage apparatus 20 holds the generated ROD token in such a manner as to be searchable later.

[Step S14] The copy-source associated storage apparatus 20 transmits a Populate Token command response to the host computer 15, which subsequently receives the Populate Token command response therefrom.

[Step S15] The host computer 15 transmits a RRTI command to the copy-source associated storage apparatus 20, which subsequently receives the RRTI command therefrom.

[Step S16] The copy-source associated storage apparatus 20 transmits the ROD token to the host computer 15, which subsequently receives the ROD token therefrom.

[Step S17] The copy-source associated storage apparatus 20 transmits a RRTI command response to the host computer 15, which subsequently receives the RRTI command response therefrom.

The steps related to the Populate Token command, the copy-source area information, and the Populate Token command response correspond to the communication related to the OFFLOAD READ request illustrated in FIGS. 4 and 5. The steps related to the RRTI command, the ROD token, and the RRTI command response correspond to the communication related to the token 50 illustrated in FIGS. 4 and 5.

Note that, for ease of explanation above, the communication of the OFFLOAD READ request and the token 50 is described to be carried out by the storage apparatus 20 associated with the copy-source volume 31. However, the communication is actually handled by a corresponding controller module 21 of the storage apparatus 20.

Figure 7:
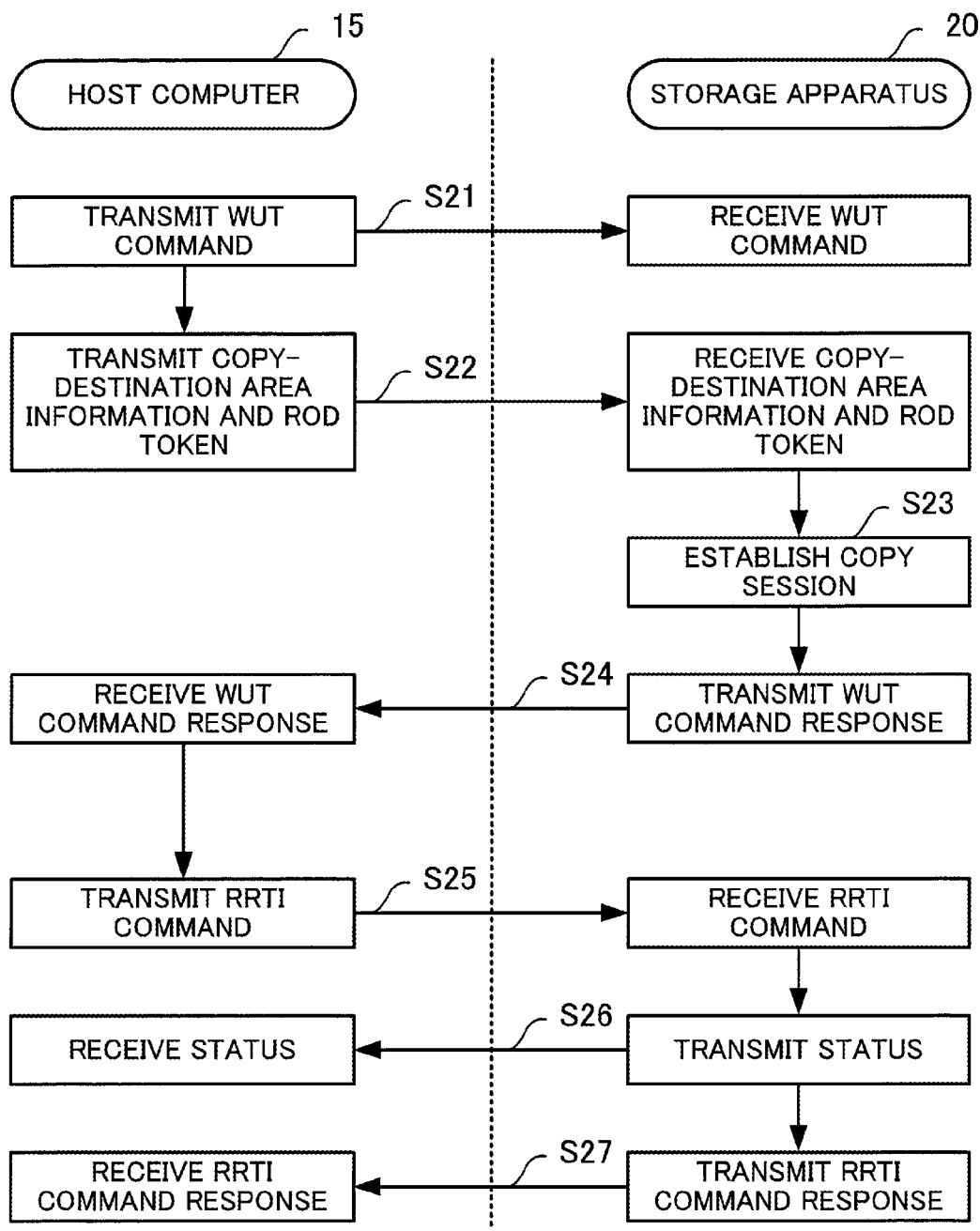
FIG. 7 illustrates a sequence diagram of an offload write process taking place during the offloaded data transfer according to the second embodiment.

A detailed command sequence related to the issuance of the OFFLOAD WRITE request from the host computer 15 to the storage apparatus 20 and the notification of the STATUS from the storage apparatus 20 to the host computer 15 described in FIGS. 4 and 5 is described next with reference to FIG. 7. FIG. 7 illustrates a sequence diagram of an offload write process taking place during offloaded data transfer according to the second embodiment.

An offload write process is started by the host computer 15. An OFFLOAD WRITE request is implemented using the EXTENDED COPY command and the RECEIVE COPY RESULTS command defined in the SCSI standard. The EXTENDED COPY command and the RECEIVE COPY RESULTS command of this case are referred to as a Write Using Token (WUT) command and a RRTI command, respectively.

[Step S21] The host computer 15 transmits a WUT command to a storage apparatus 20 associated with the copy-destination (i.e., transfer-destination) volume 34 (hereinafter, also referred to as the "copy-destination associated storage apparatus 20"). The copy-destination associated storage apparatus 20 receives the WUT command from the host computer 15.

[Step S22] The host computer 15 transmits copy-destination area information and a ROD token to the copy-destination associated storage apparatus 20, which subsequently receives the copy-destination area information and the ROD token therefrom. The copy-destination area information (i.e., transfer destination data-identifiable information) is information in a list form which contains information composed of the transfer-destination LUN 39 and the transfer-destination memory area 40.

[Step S23] The copy-destination associated storage apparatus 20 searches for the same ROD token as the received ROD token from ROD tokens held by the storage apparatus 20 associated with the copy-source volume 31. The copy-destination associated storage apparatus 20 compares and verifies the received ROD token with a ROD token found in the search, and establishes a copy session 45 based on the copy-destination area information and the ROD token if the received and found ROD tokens match each other.

[Step S24] The copy-destination associated storage apparatus 20 transmits a WUT command response to the host computer 15, which subsequently receives the WUT command response therefrom.

[Step S25] The host computer 15 transmits a RRTI command to the copy-destination associated storage apparatus 20, which subsequently receives the RRTI command therefrom.

[Step S26] The copy-destination associated storage apparatus 20 transmits a STATUS to the host computer 15, which subsequently receives the STATUS therefrom.

Note that in the case of an asynchronous operation of the offloaded data transfer, the copy-destination associated storage apparatus 20 immediately transmits the STATUS to the host computer 15. On the other hand, in the case of a synchronous operation, the copy-destination associated storage apparatus 20 transmits the STATUS after completion of the copy operation.

[Step S27] The copy-destination associated storage apparatus 20 transmits a RRTI command response to the host computer 15, which subsequently receives the RRTI command response therefrom.

The steps related to the WUT command, the copy-destination area information and the ROD token, and the WUT command response correspond to the communication related to the OFFLOAD WRITE request illustrated in FIGS. 4 and 5. The steps related to the RRTI command, the STATUS, and the RRTI command response correspond to the communication related to the STATUS illustrated in FIGS. 4 and 5.

Note that, for ease of explanation above, the communication of the OFFLOAD WRITE request and the STATUS is described to be carried out by the storage apparatus 20 associated with the copy-destination volume 34. However, the communication is actually handled by a corresponding controller module 21 of the storage apparatus 20.

Figure 8:
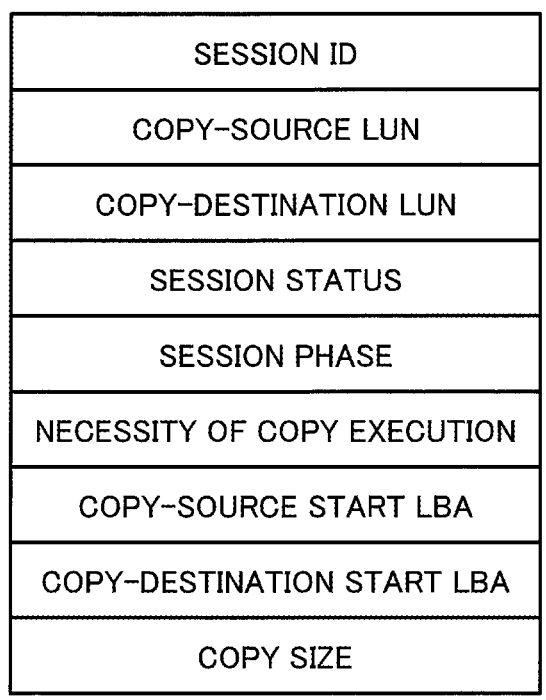
FIG. 8 illustrates an example of a session management table according to the second embodiment.

Next described is a session management table 55, with reference to FIG. 8. FIG. 8 illustrates an example of a session management table according to the second embodiment. The session management table 55 includes a session identification (ID), a copy-source LUN, a copy-destination LUN, a session status, a session phase, and necessity of copy execution. The session management table 55 further includes a copy-source start logical block address (LBA) (i.e., transfer-source memory area), a copy-destination start LBA (transfer-destination memory area), and a copy size (transfer size).

The session ID is identification information uniquely identifying a copy session. The session ID is, for example, one of sequential numbers assigned to individual sessions in the order of copy session establishment. Each LUN is identification information uniquely identifying a volume created by logically dividing a RAID group and is, for example, a sequential number. The copy-source LUN is a number identifying a copy-source volume, and the copy-destination LUN is a number identifying a copy-destination volume. Note that one or more volumes (logical units) identified by individual LUNs are provided for a single RAID group. Therefore, if the RAID group is made up of multiple HDDs 25, a volume may straddle two or more of the HDDs 25.

The session status is information indicating a status of the copy session, that is, a current status of the copy operation. Statuses used to represent the session status include "Active", "Suspend", "ErrorSuspend", and "Reserve". The status "Active" indicates the copy operation being in execution, and the status "Suspend" indicates the copy operation being temporarily suspended. In addition, the status "ErrorSuspend" indicates that the copy operation has ended in failure and, for example, the execution of the copy operation has been stopped. The status "Reserve" indicates a transient state before the start of the copy operation. The session phase is information indicating a progress status of the copy operation. Statuses used to represent the session phase include "Copying" and "Equivalent". The status "Copying" indicates the copying operation being in progress while the status "Equivalent" indicates that the copy operation has been completed and data of the copy destination has become equivalent to that of the copy source. The necessity of copy execution is information used to determine whether to execute the copy operation. The copy-source start LBA is information identifying a logical block address of the copy-source volume. The copy-destination start LBA is a logical block address of the copy-destination volume. The copy size is information indicating the size of data to be copied.

Figure 9:
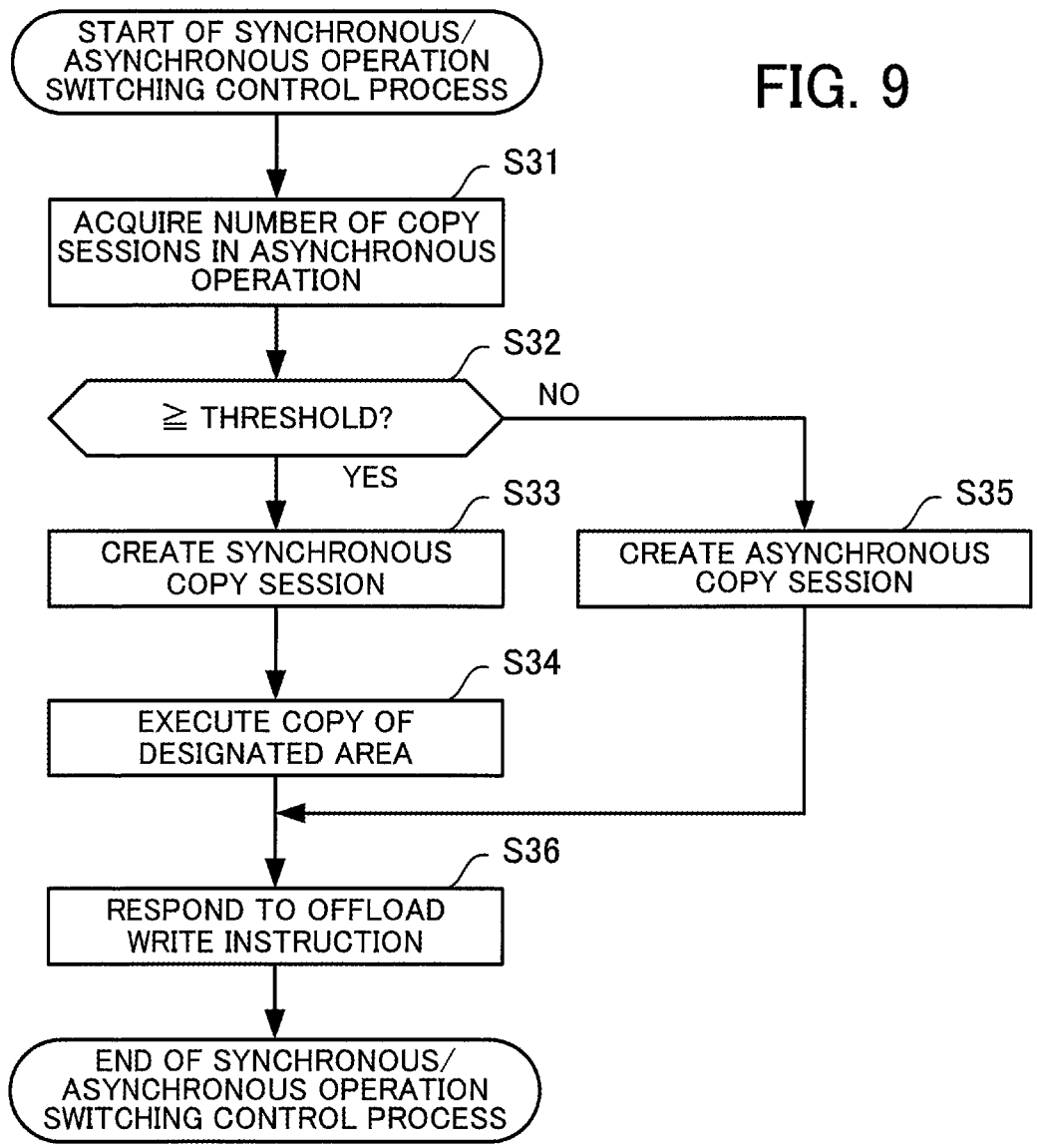
FIG. 9 illustrates a flowchart of a synchronous/asynchronous operation switching control process according to the second embodiment.

Next described is synchronous/asynchronous operation switching control executed by the storage apparatus 20 associated with the copy-destination volume 34 according to the second embodiment, with reference to FIG. 9. FIG. 9 illustrates a flowchart of a synchronous/asynchronous operation switching control process according to the second embodiment. The synchronous/asynchronous operation switching control process is executed during the offload write process.

[Step S31] The storage apparatus 20 associated with the copy-destination volume 34 acquires the number of copy sessions in the asynchronous operation. The number of copy sessions in the asynchronous operation is figured out from the number of copy sessions 45 accumulated in the schedule queue 51.

[Step S32] The copy-destination associated storage apparatus 20 determines whether the number of copy sessions in the asynchronous operation is equal to or more than a predetermined threshold. The copy-destination associated storage apparatus 20 proceeds to step S33 if the determination is affirmative, and proceeds to step S35 if the determination is negative.

Since the number of copy sessions in the asynchronous operation correlates with the amount of resources used by the storage apparatus 20 to manage the copy sessions 45, the number of copy sessions in the asynchronous operation may be considered as the amount of load incurred by the asynchronous operation. Therefore, the storage apparatus 20 monitors the number of copy sessions in the asynchronous operation to thereby detect the load incurred by the asynchronous operation.

[Step S33] Since having detected overload incurred by the asynchronous operation, the copy-destination associated storage apparatus 20 creates a copy session 45 for the synchronous operation.

[Step S34] According to the synchronous copy session 45, the copy-destination associated storage apparatus 20 executes copy of a designated area.

[Step S35] Since having detected no overload incurred by the asynchronous operation, the copy-destination associated storage apparatus 20 creates a copy session 45 for the asynchronous operation.

[Step S36] The copy-destination associated storage apparatus 20 makes a response to a corresponding OFFLOAD WRITE instruction and ends the synchronous/asynchronous operation switching control process. That is, the copy-destination associated storage apparatus 20 transmits an RRTI command response and, then, transmits a STATUS. After transmitting the RRTI command response and the STATUS, the copy-destination associated storage apparatus 20 ends the synchronous/asynchronous operation switching control process.

In this manner, with respect to the synchronous copy session 45, the copy-destination associated storage apparatus 20 makes a response to the OFFLOAD WRITE instruction after executing copy of the designated area. On the other hand, with respect to the asynchronous copy session 45, the copy-destination associated storage apparatus 20 makes a response to the OFFLOAD WRITE instruction before executing copy of the designated area.

Note that, for ease of explanation above, the synchronous/asynchronous operation switching control process is described to be carried out by the storage apparatus 20 associated with the copy-destination volume 34. However, the switching control process is actually handled by a corresponding controller module 21 of the storage apparatus 20.

Figure 10:
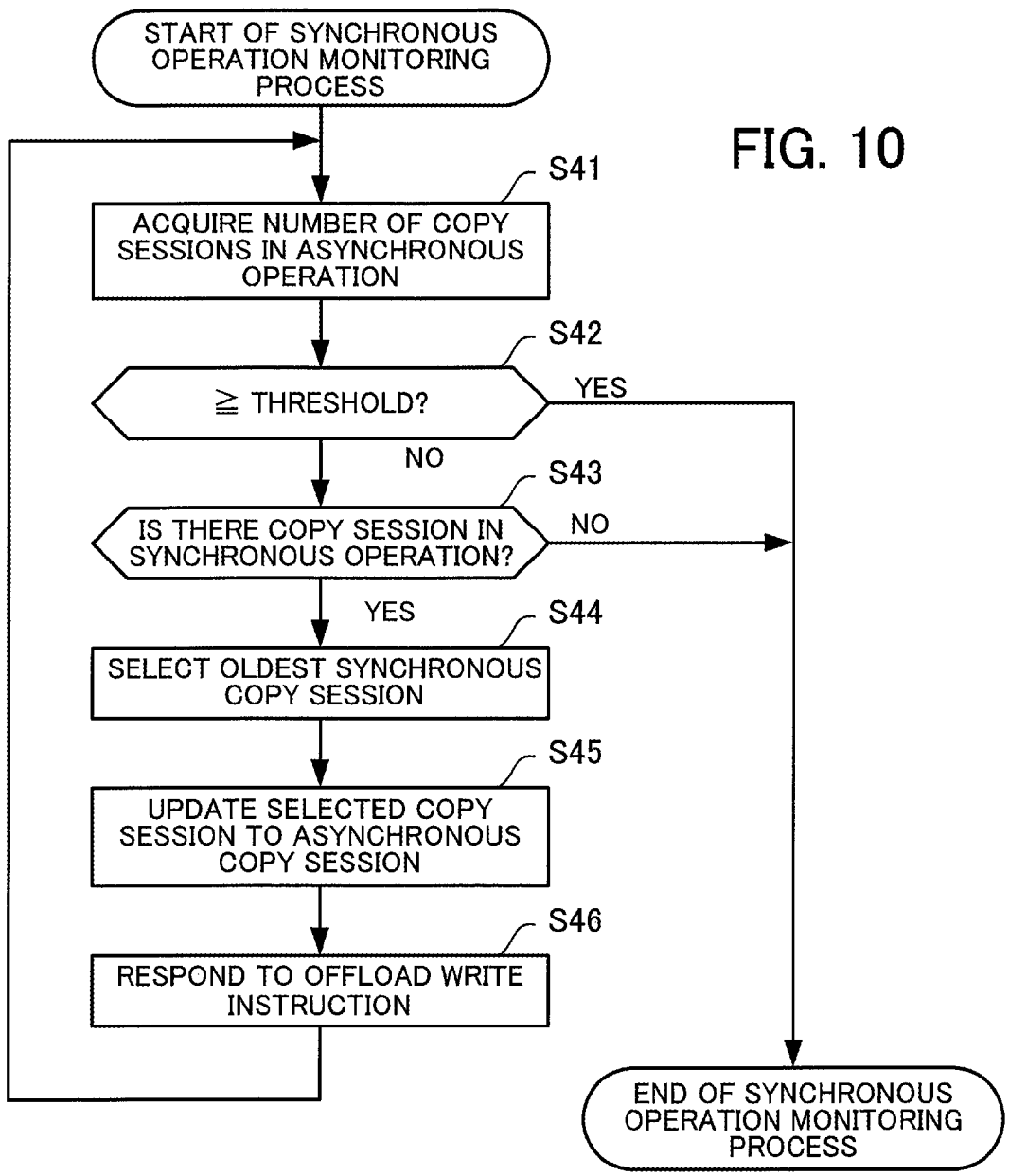
FIG. 10 illustrates a flowchart of a synchronous operation monitoring process according to the second embodiment.

Next described is a synchronous operation monitoring process executed by the storage apparatus 20 associated with the copy-destination volume 34 according to the second embodiment, with reference to FIG. 10. FIG. 10 illustrates a flowchart of a synchronous operation monitoring process according to the second embodiment. The synchronous operation monitoring process is periodically carried out by monitoring a timer. Note however that the synchronous operation monitoring process may be carried out irregularly in response to an event, such as the completion of a copy operation in an asynchronous copy session 45.

[Step S41] The storage apparatus 20 associated with the copy-destination volume 34 acquires the number of copy sessions in the asynchronous operation.

[Step S42] The copy-destination associated storage apparatus 20 determines whether the number of copy sessions in the asynchronous operation is equal to or more than a predetermined threshold. The copy-destination associated storage apparatus 20 ends the synchronous operation monitoring process if the determination is affirmative, and proceeds to step S43 if the determination is negative.

Note that the threshold used in the synchronous operation monitoring process may be the same as that used for the determination in step S32 of the synchronous/asynchronous operation switching control process, or may be provided separately.

[Step S43] The copy-destination associated storage apparatus 20 determines if there is a copy session 45 in the synchronous operation. The copy-destination associated storage apparatus 20 proceeds to step S44 if the determination is affirmative, and ends the synchronous operation monitoring process if the determination is negative.

[Step S44] The copy-destination associated storage apparatus 20 selects the oldest copy session 45 from among copy sessions 45 in the synchronous operation.

[Step S45] The copy-destination associated storage apparatus 20 updates the selected copy session 45 in the synchronous operation to an asynchronous copy session 45.

[Step S46] The copy-destination associated storage apparatus 20 makes a response to a corresponding OFFLOAD WRITE instruction and proceeds to step S41.

In this manner, the storage apparatus 20 changes a copy session 45 once determined to run in the synchronous operation to an asynchronous copy session 45 depending on load incurred by the asynchronous operation. This allows the storage apparatus 20 to further improve the efficiency of copy control.

Note that the above-described processing functions may be achieved by a computer. In this case, a program is provided in which processing contents of functions that the information processing apparatus 1 and the storage apparatus 20 (the creating unit 3, the control unit 7, and the like) need to have are described. By executing the program on the computer, the above-described processing functions are achieved on the computer. The program in which processing contents are described may be recorded in a computer-readable recording medium. Such computer-readable recording media include a magnetic storage device, an optical disk, a magneto-optical recording medium, and a semiconductor memory. Examples of the magnetic storage device are a HDD, a flexible disk (FD), and a magnetic tape. Examples of the optical disk are a digital versatile disc (DVD), a DVD-RAM, a compact disc read-only memory (CD-ROM), and a CD rewritable (CD-RW). An example of the magneto-optical recording medium is a magneto-optical disk (MO).

In the case of distributing the program, portable recording media, such as DVDs and CD-ROMs, on which the program is recorded are sold. In addition, the program may be stored in a memory device of a server computer and then transferred from the server computer to another computer via a network.

A computer for executing the program stores the program, which is originally recorded in a portable recording medium or transferred from the server computer, in its own memory device. Subsequently, the computer reads the program from its own memory device and performs processing according to the program. Note that the computer is able to read the program directly from the portable recording medium and perform processing according to the program. In addition, the computer is able to sequentially perform processing according to a received program each time such a program is transferred from the server computer connected via the network.

In addition, at least part of the above-described processing functions may be achieved by an electronic circuit, such as a digital signal processor (DSP), an application specific integrated circuit (ASIC), and a programmable logic device (PLD).

According to aspects, there are provided an information processing apparatus and a copy control method supporting the offloaded data transfer function and capable of improving the efficiency of copy control.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
one or more processors each that perform a procedure including:
creating, on receiving an offloaded data transfer instruction, a copy session for transferring data from a transfer-source memory area of a transfer-source memory apparatus to a transfer-destination memory area of a transfer-destination memory apparatus;
enqueuing the created copy session in a queue; and
controlling switching between asynchronous execution control and synchronous execution control based on load incurred by the asynchronous execution control, the asynchronous execution control being data transfer control under which a completion response to the offloaded data transfer instruction is made prior to completion of the data transfer of the copy session dequeued from the queue and the data transfer is subsequently carried out, and the synchronous execution control being data transfer control under which the completion response to the offloaded data transfer instruction is made after the completion of the data transfer of the copy session, wherein the load incurred by the asynchronous execution control is determined as overload when a number of asynchronous copy sessions among all copy sessions included in the queue exceeds a predetermined threshold, wherein the data transfer of the copy session is determined to be executed under the asynchronous execution control upon determining that the load is not overload when the copy session is created, and wherein the data transfer of the copy session is determined to be executed under the synchronous execution control upon determining that the load is overload when the copy session is created.

2. The information processing apparatus according to claim 1, wherein the controlling updates, based on the load incurred by the asynchronous execution control, the data transfer control of the copy session from the synchronous execution control to the asynchronous execution control.

3. The information processing apparatus according to claim 1, wherein the information processing apparatus is a storage control apparatus which controls the transfer-source memory apparatus.

4. The information processing apparatus according to claim 1, wherein the procedure further includes:

selecting an oldest synchronous copy session from among all synchronous copy sessions included in the queue and changing the selected oldest synchronous copy session to an asynchronous copy session, when the number of asynchronous copy sessions falls below another predetermined threshold.

5. A computer-readable storage medium storing a computer program, the computer program causing a computer to perform a procedure comprising:

enqueuing a copy session in a queue; and switching, when detecting overload incurred by asynchronous execution control under which a completion response to an offloaded data transfer instruction is made and data transfer of the copy session is subsequently carried out, control of the data transfer of the copy session dequeued from the queue from the asynchronous execution control to synchronous execution control under which the completion response to the offloaded data transfer instruction is made after completion of the data transfer of the copy session, wherein the overload is detected when a number of asynchronous copy sessions among all copy sessions included in the queue exceeds a predetermined threshold, wherein the data transfer of the copy session is determined to be executed under the asynchronous execution control upon detecting no overload, and wherein the data transfer of the copy session is determined to be executed under the synchronous execution control upon detecting the overload.

6. A copy control method comprising:

enqueuing a copy session in a queue; and switching, by a computer, control of data transfer of the copy session dequeued from the queue from asynchronous execution control to synchronous execution control when detecting overload incurred by the asynchronous execution control, the asynchronous execution control being data transfer control under which a completion response to an offloaded data transfer instruction is made and the data transfer of the copy session is subsequently carried out, and the synchronous execution control being data transfer control under which the completion response to the offloaded data transfer instruction is made after completion of the data transfer of the copy session, wherein the overload is detected when a number of asynchronous copy sessions among all copy sessions included in the queue exceeds a predetermined threshold, wherein the data transfer of the copy session is determined to be executed under the asynchronous execution control upon detecting no overload, and wherein the data transfer of the copy session is determined to be executed under the synchronous execution control upon detecting the overload.

* * * * *